Aug. 12, 1941.　　　A. LE R. MAY　　　2,252,600
MINIATURE MOTOR
Filed Nov. 24, 1939　　　3 Sheets-Sheet 1
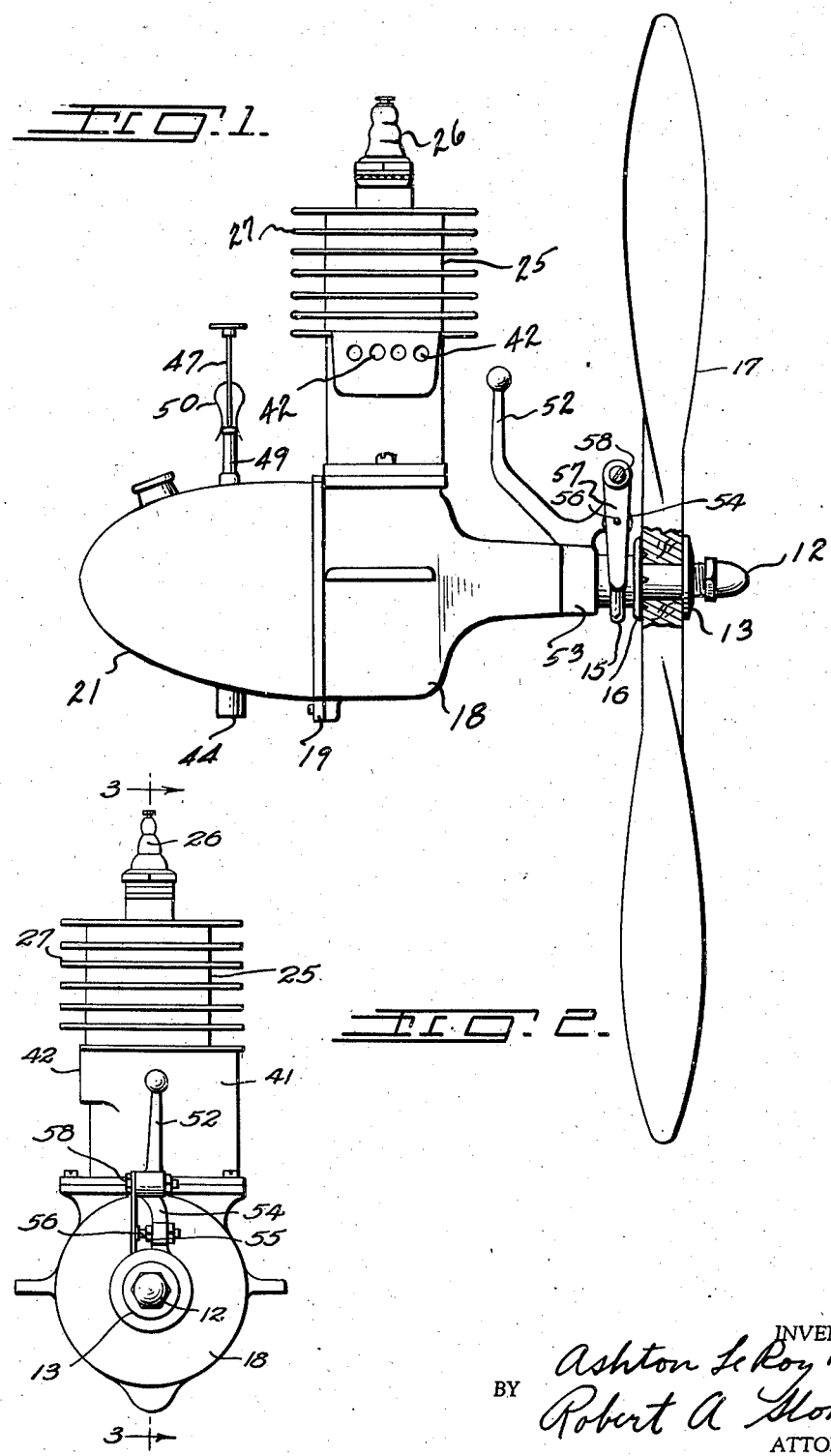
INVENTOR.
Ashton LeRoy May
BY Robert A. Sloman
ATTORNEY.

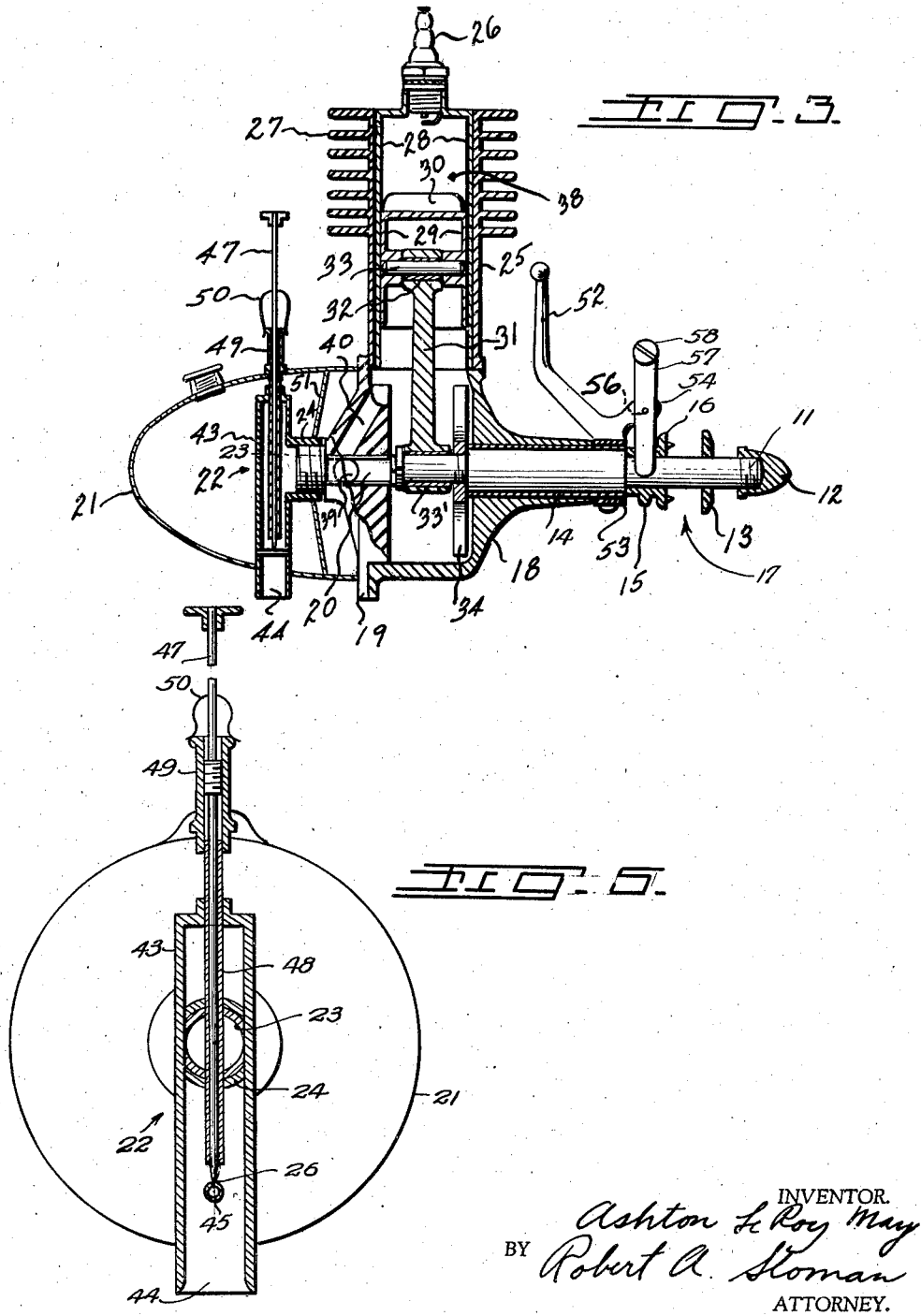

Aug. 12, 1941.  A. LE R. MAY  2,252,600
MINIATURE MOTOR
Filed Nov. 24, 1939   3 Sheets-Sheet 3
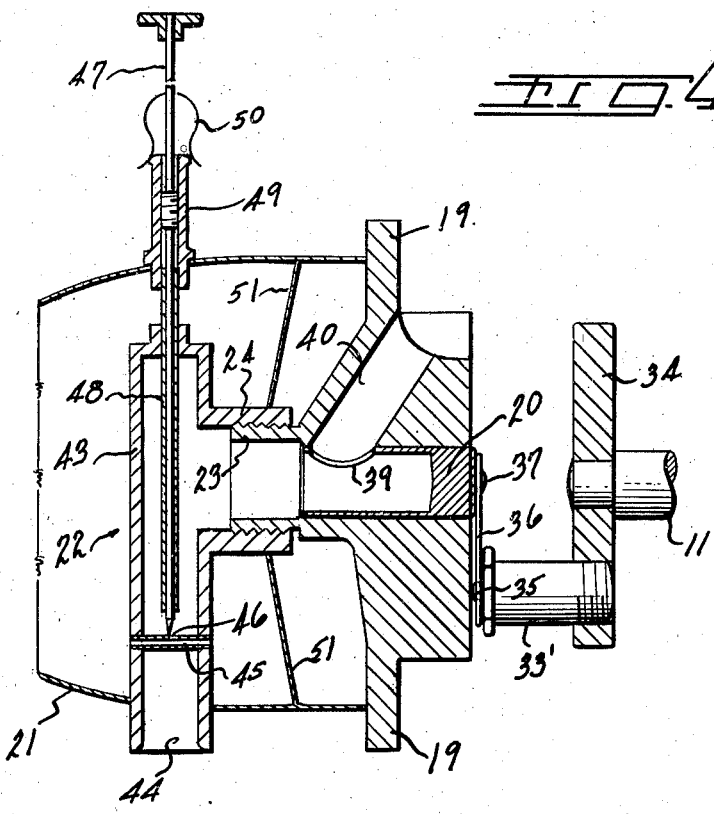
INVENTOR.
Ashton Le Roy May
BY Robert A. Sloman
ATTORNEY.

Patented Aug. 12, 1941

2,252,600

UNITED STATES PATENT OFFICE 2,252,600

MINIATURE MOTOR

Ashton Le Roy May, Detroit, Mich.

Application November 24, 1939, Serial No. 305,854

2 Claims. (Cl. 123—195)

This invention relates to a miniature motor of the internal combustion type.

It is the object of this invention to provide an efficient, precision built engine carefully designed for model aeroplanes, race cars, boats and the like.

It is the object hereof to provide a light weight engine of greatly simplified structure.

It is the further object to provide an engine having no pipes, carburetor or clamps bolted to the cylinder.

It is the further object hereof to provide a novel carburetor installed within the gas tank to insure complete efficiency.

It is the still further object hereof to provide a novel rotary valve eliminating all back pressure in the carburetor and providing a full volatile charge for every stroke.

This invention relates to the various combinations, sub-combinations, and arrangements of parts as will be set forth in the more specific description, claims and drawings, it being understood that said drawings are merely illustrations by way of example and are not intended to limit the scope of this invention.

Referring to the drawings:

Figure 1 is a side elevation of the motor.

Figure 2 is an end elevation thereof.

Figure 3 is a section on line 3—3 of Figure 2.

Figure 4 is an enlarged fragmentary section of a portion of the motor, and

Figure 5 is an enlarged section of the carburetor.

As illustrated in Figure 3, the crank shaft 11 with nut 12 and washer 13 journaled through the oilite or other type of bearing 14, has secured thereon the timer cam 15 and washer 16 integral therewith.

The two washers 13 and 16 are designed to operatively secure a propeller blade 17 therebetween.

The crank case housing 18 designed to also support the bearing 14, is closed by a back cover plate 19 suitably bolted thereto (bolts not shown), said cover plate being centrally bored to rotatably journal the rotary valve 20. The gasoline tank 21 with carburetor 22 transversely disposed and secured therein is threadably attached to the hollow extended portion 23 of the back cover plate 19 by means of the interiorly threaded outlet 24 of said carburetor. Thus secured the end portion of the gas tank registers with the peripheral edge of the back cover plate 19 to complete the closure.

The cylinder 25 suitably bolted to the top of crank case 18 with spark plug 26 and projecting cooling fins 27 has longitudinally disposed therein the cast steel sleeve 28 honed to a mirror finish.

The piston 29 with baffle plate 30, designed to reciprocate within sleeve 28 is actuated by piston rod 31 secured thereto by bearing 32 and pin 33.

Operatively secured to the crank shaft 11 to rotate therewith is the crank-throw 34 designed to counterbalance piston-rod 31, the latter being eccentrically mounted to said crank-throw by means of a bearing and crank pin 33' threaded thereto.

Referring to Figure 4, it will be seen that the rotary valve 20 connected with the carburetor outlet 24 is rotatably journaled transversely within the back cover plate 19.

Crank pin 33' has a projection 35 upon its end to which is operatively and pivotally secured a crank 36, the opposite end of which is fixedly mounted on the base portion of the rotary valve at point 37. Consequently the rotary valve is revolved with the crank shaft and a mixture of gasoline and air supplied to the compression chamber 38 to be acted upon by each compression movement of the piston.

The circular opening 39 in the side of the valve communicates once each revolution with channel 40 formed within the back cover plate 19 leading into the crank case. A by-pass 41 formed upon the outside wall of cylinder 25 communicates with the interior of said crank case on one end thereof and with the cylinder chamber 38 on the other hand. However, it will be noted that access to the combustion chamber is cut off by piston 29 as the same rises into compression. After an explosion, the resulting downward motion of the piston, opens the exhaust ports 42 on one side of the baffle plate 30, while simultaneously a new mixture is allowed to enter the cylinder chamber through by-pass 41, entering said chamber on the opposite site of baffle 30.

Referring now to Figures 4 and 5, it will be seen that the carburetor 22 is entirely within the gasoline tank 21. The carburetor tube 43 with air intake 44 has a gasoline inlet tube 45 communicating with the tank interior. The flow of gasoline into the carburetor through opening 46 in tube 43, is regulated by the needle 47 journaled through the needle guide 48, the latter being centrally disposed within the carburetor tube 43.

The interiorly threaded collar 49, through which the needle 47 is operatively and resiliently journaled by means of the tension spring 50 provides means for manual adjustment of the gas inlet opening 46 to regulate the volatile mixture of air and gasoline entering the carburetor outlet 24.

The web portion 51 integral with the gasoline tank and having a central opening for receiving the carburetor outlet 24, provides a suitable closure for the tank.

Referring to Figures 2 and 3 it will be seen that the timer arm 52 is provided with a split sleeve 53 upon its lower extremity whereby said arm may be loosely clamped upon the bearing 14 for manual regulation thereof.

The forward end 54 of said timer arm is provided with a contact point 55 to intermittently register with contact point 56 which is centrally disposed upon the leaf spring 57. Said leaf spring mounted upon the forward portion 54 of the timer arm by means of a screw 58 in insulated relation with respect to the contact point 55, downwardly depends from said screw whereby it registers with the aforementioned timing cam 15, the latter being fixedly mounted upon the crank shaft. By this means electric contact is made and broken intermittently by the contact carrying leaf spring 57 for completing a circuit between a battery, coil and spark plug for producing an intermittent spark in the aforesaid combustion chamber 38. The obvious simplicity of the timing mechanism, and the ease with which it may be adjusted tend to produce an engine of high efficiency. The efficiency is further enhanced by the rotary valve 20 for conducting a volatile vapor directly through the crank case to the compression chamber.

The rotary valve eliminates all back pressure in the carburetor by intermittently closing off the same, and provides a full charge to the combustion chamber for every compression stroke of the piston. By designing a carburetor entirely within the gasoline tank the streamlined effect of the motor is greatly enhanced and at the same time insures a greater efficiency when used with model aeroplanes.

Having described my invention, reference should now be had to the claims which follow for determining the scope thereof.

I claim:

1. An internal combustion engine comprised of a crankcase, a crankshaft, a crankcase cover plate, a fuel tank, a carburetor within said fuel tank centrally secured to said cover plate for retaining said tank, said cover plate having an opening communicating with the crankcase and with the carburetor, a hollow cylindrical crankshaft actuated valve journaled therein, having a lateral opening, there being a radial passage in said cover plate communicating with said lateral opening and with the crankcase.

2. An internal combustion engine comprised of a cylindrical crankcase with an elongated portion of substantially reduced diameter, a crankshaft journaled within said elongated portion, a crankcase cover plate, a fuel tank, a carburetor within said fuel tank centrally secured to said cover plate for retaining said tank, said cover plate having an opening communicating with the crankcase and with the carburetor, a hollow cylindrical crankshaft actuated valve journaled therein, having a lateral opening, there being a radial passage in said cover plate communicating with said lateral opening and with the crankcase.

ASHTON LE ROY MAY.